Feb. 1, 1938. P. S. GOSS Re. 20,642
PRIMER VALVE
Original Filed March 6, 1933
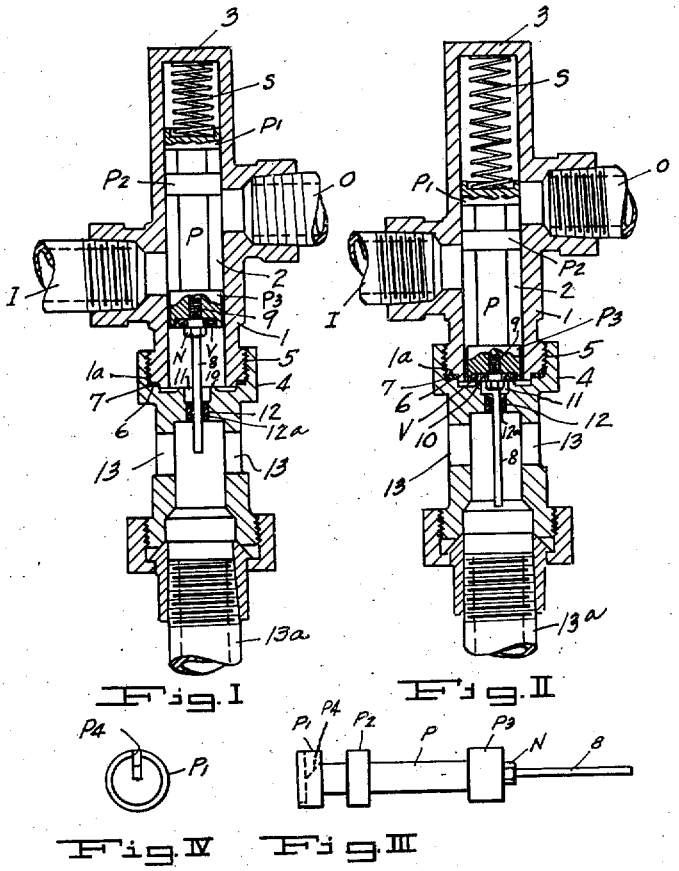
INVENTOR
PHILIP S. GOSS
BY James L. Giovanni
ATTORNEY Reissued Feb. 1, 1938

Re. 20,642

UNITED STATES PATENT OFFICE 20,642

PRIMER VALVE

Philip S. Goss, Portland, Oreg.

Original No. 1,970,744, dated August 21, 1934, Serial No. 659,605, March 6, 1933. Application for reissue November 23, 1936, Serial No. 112,612

5 Claims. (Cl. 182—12)

My invention relates to devices whereby an intermittent supply of water is furnished in small quantities to a trap such as the trap of a floor drain or other infrequently used fixture to prevent evaporation from breaking the seal of the trap and the advantages of the invention reside in the construction and combination of the parts of which it is composed. The present invention is an improvement on the type of primer valve shown and described in United States Patent Number 1,759,826, dated May 20, 1930.

One of the objects of my invention is to provide an appliance of the character indicated that will meter an unfailing small amount of water to a trap without wasting it and without being subjected to the disadvantage ordinarily accompanying a small metering opening that frequently closes entirely if made small enough so that it will not waste water.

Another object of my invention is to provide a device of the character described wherein an air gap is placed in the waste pipe to effectually prevent siphonage of polluted water from a trap into a supply system in case of a breakage of a water main or any other contingency that would tend to induce such action.

A further object of my invention is to provide a means to prevent splashing of the water supplied for the trap through the air gap.

These and other objects of the invention will be fully explained in this specification and particularly pointed out in the claims.

A drawing accompanies and forms a part of this specification in which,—

Fig. I is a longitudinal section of my primer valve showing the position of the various parts when it is in full service and operating;

Fig. II is a view of the same structure in a state of rest;

Both views are sectioned in part and uniformly, to clearly delineate its construction;

Fig. III is a view of the plunger P removed from the body of the valve; and

Fig. IV is a projection of Fig. III.

A body, 1, is provided with a central bore, 2, which should be reamed and finished smoothly on the inside. The top of the body, 3, is preferably closed and made integral with 1. At the lower end a closure, 4, is provided threaded at 5 and provided with a seat, 6, upon which is placed a gasket, 7, of any suitable material which upon threading the two parts together will be compressed to form a watertight joint between that portion of the body indicated by 1*a* and the seat, 6. Mounted within the body, 1, is the plunger, P, which carries three bosses indicated by P1, P2 and P3. The first two of the bosses, P1 and P2 will be a fairly close fit in the central bore, 2, though as is well known it is not possible to make such a fit so that it will be fluid tight and remain so and neither in this case is it expedient to do this. However the fit should be such that any tendency to liquid flow from the inlet I, toward the outlet, O, will influence the boss P2. The boss P3 is fitted more loosely within the central bore, 2, so that fluids can pass freely between its perimeter and the bore 2. A spring, S, is placed in the top of the central bore, 2, so that a slight initial compression is had when the parts are in position as shown in Fig. II and this spring is made light enough so that only a few ounces of pressure are exerted against the boss P1 when the parts are in position as shown in Fig. I.

The boss P1 not only serves as an abutment for the spring S but also serves as a stabilizer for the plunger P during its sliding movement within the bore 2. The hollow cylindrical top 3 of the body is closed, as shown, and receives the boss P1 on upward movement of the plunger P. In order to prevent the action of the boss P1 from being interfered with by reason of accumulation of water, or possibly air, within the cylindrical top, I form a slot P4 to permit its escapement.

Another important object of the vent or opening P4 is to allow water to drain from the cylindrical housing 3, particularly when it is desired to drain the water system to prevent freezing or for any other reason.

Imbedded in the lower part of the boss P3 is a valve gasket, V, being firmly held in place by the nut, N, mounted on the stem, 8, which is threaded at its upper end into the boss P3 as indicated at 9. On the interior surface of the closure, 4, is a raised valve seat, 10, within which is a pocket, 11, to accommodate the nut N. The stem 8 as shown extends a considerable distance below the nut N and extends at all times through the pocket 11 and through an inserted bushing, 12, and is of such further length that even when the valve is wide open, as shown in Fig. I, it will extend well past the top of the air gap, 13, and the reason for this is hereinafter explained. It will be noted that the inserted bushing, 12, is made slightly larger in internal diameter than the stem 8 as shown at 12*a*.

This valve will customarily be installed in a supply line to a frequently used fixture such as a kitchen sink and the inlet I will be connected to a source of water supply under pressure and the outlet O will be a continuation of this water supply toward the fixture; it may be a kitchen sink as indicated. When no water is being used at the fixture a balanced pressure will exist throughout the priming valve except that there will be a hydrostatic tendency to keep the plunger P downward and the valve V in contact with the seat ring, 10, due to the difference in area between the seat ring, 10, and the bosses, P1 and P2. This hydrostatic pressure will be in addition to the slight pressure imposed by the spring S.

As soon as a faucet is opened and water starts to flow from I toward O, the reduction in pressure on the O side of the fixture will cause pressure under P2 and P1 and that part of P3 without the seat ring 10 to raise the whole internal structure toward the position shown in Fig. I of the drawing; whereupon, a comparatively free passageway for water from I toward O will be established and the valve V will be raised off of the seat ring 10 and fluid at full pressure will tend to flow through the metering opening 12*a*, that is the annular space between the stem 8 and the inside of the bushing 12. This annular space or opening will ordinarily be only a few thousandths of an inch, say five thousandths of an inch if the stem 8 is made one-eighth of an inch in diameter, which is suggested as a good dimension. A thin small stream of water will then find its way through 12a and will hub the lower end of the stem 8, having its velocity reduced to that induced by gravity and will drop off the lower end of the stem 8 without splashing outwardly through the air gap 13 or indeed moistening the inside of the passageway adjacent the air gap. This lack of splashing and moistening tends to cleanliness since dust will not stick if the surfaces are dry to such an extent that it will if they are damp.

The lower cylindrical portion of the closure 4, through which the air gaps 13 are formed, is connected by means of a pipe 13*a* with the floor drain trap. The air gaps 13 prevent siphonage of polluted water or sewer gas from the drain trap into the water supply system in case of a breakage of a water main or any other contingency that would tend to induce such action.

The stem 8 should be made of noncorrosive metal, nickel iron alloys are suggested, and brass and copper ordinarily will not suffice. The bushing 12 should also be made of a similar metal for the reason that practically all domestic water supplies nowadays carry some vegetable acids and a small portion of chlorine and where exposed to atmospheric oxygen, as these parts are for the greater portion of the time, they will corrode and if left for any considerable time corrosion will cause the valve to stick.

By making the valve as I have made it with a seat rim completely independent from the opening or metering device, I have overcome a very serious difficulty; for if the metering opening is made small enough to limit the flow to what will flow under a given pressure through the annular opening 12*a*, then any slight scale or substance found in the water will close it altogether and the purpose of installing the valve will be defeated. If a small metering opening is provided with a valve that closes it directly, very small pressure differential to keep the valve closed hydrostatically can be available and a comparatively strong spring must be used to prevent continual leakage and such a spring tends to interfere with water supply to the master fixture. It will be noted that the instant the master fixture starts to use water the pressure differential is reversed.

By making the stem 8 so that it moves through the bushing 12 every time water is drawn through a control fixture, such as a kitchen sink, then a trap supplied by it will receive a small but unfailing amount of water and a dangerous menace to public health will be removed. This menace is so well appreciated that in a large number of first class cities cellar floor drains are not permitted to be connected to the sewer system.

Having thus fully described my invention, the manner of its use and the advantage due to its use, what I claim as new and desire to secure by Letters Patent, is:—

1. A priming valve for a trap defined in part as a body member having a bore therein, a plunger in said bore that is movable under the influence of liquid flow therethrough, a valve member carried by said plunger, a co-operating valve seat for said valve, a metering discharge outlet beyond and spaced from said valve and seat, a stem projecting through said metering outlet that is attached to the valve and movable therewith to prevent clogging of said metering outlet, a passageway below said metering outlet, and air gaps in said passageway, the said stem being arranged to direct flow from said metering outlet past said air gap.

2. In a metering outlet for a priming valve, a tube, a stem in said tube to restrict its area to an annular space between the stem and the inside of the tube, and a hydraulically operated valve to control the flow through the metering outlet that is spaced therefrom, the said stem being attached to said valve and movable therewith to prevent clogging of said metering outlet.

3. In a priming valve, a bore therein that forms a part of a conduit from a source of water supply under pressure to a water consuming fixture, a branch outlet from said bore to supply water to a trap, a valve controlling the branch outlet, hydraulic means for controlling said valve to open said valve under the influence of flow to the fixture, means to press the valve to its seat in the absence of flow, a metering opening below said valve, an air gap below said metering opening, and a stem attached to said valve and projecting through said metering opening and past said air gap.

4. A priming valve for a trap defined as a body having a passageway therethrough that is part of a conduit from a source of water supply under pressure to a water consuming fixture, a hydraulically operated plunger in said passageway movable under influence of flow toward said fixture, a valve member attached to said plunger that controls flow to a trap, a co-operating seat for said valve, a metering outlet spaced beyond said seat, a stem attached to said valve that projects through said metering outlet to restrict its area to an annular space between the inside of the outlet and the stem, said stem being movable with said valve to prevent clogging of said metering outlet.

5. A priming valve for a trap defined in part as a body member having a bore therein closed at one of its ends, a plunger in said bore that is movable under the influence of liquid flow therethrough, an opening in said plunger to relieve air or water pressure between the end of the plunger and the closed end of said housing, a valve member carried by said plunger, a co-operating valve seat for said valve, a metering discharge outlet beyond and spaced from said valve and seat, a stem projecting through said metering outlet that is attached to the valve and movable therewith to prevent clogging of said metering outlet, a passageway below said metering outlet, and air gaps in said passageway, the said stem being arranged to direct flow from said metering outlet past said air gap.

PHILIP S. GOSS.